United States Patent
Kelly

(10) Patent No.: US 11,474,839 B2
(45) Date of Patent: Oct. 18, 2022

(54) SYSTEMS AND METHODS FOR CONNECTION BROKER FREE REMOTE DESKTOP CONNECTIONS IN A VIRTUAL DESKTOP ENVIRONMENT

(71) Applicant: DELL PRODUCTS L.P., Round Rock, TX (US)

(72) Inventor: John Kelly, Mallow (IE)

(73) Assignee: DELL PRODUCTS L.P., Round Rock, TX (US)

( * ) Notice: Subject to any disclaimer, the term of this patent is extended or adjusted under 35 U.S.C. 154(b) by 214 days.

(21) Appl. No.: 17/021,856

(22) Filed: Sep. 15, 2020

(65) Prior Publication Data

US 2022/0083355 A1    Mar. 17, 2022

(51) Int. Cl.
| | | |
|---|---|---|
| G06F 15/173 | (2006.01) | |
| G06F 9/451 | (2018.01) | |
| G06F 9/50 | (2006.01) | |
| H04L 67/141 | (2022.01) | |
| H04L 69/324 | (2022.01) | |
| H04L 12/18 | (2006.01) | |
| H04L 9/40 | (2022.01) | |

(52) U.S. Cl.
CPC ............ G06F 9/452 (2018.02); G06F 9/5077 (2013.01); H04L 12/18 (2013.01); H04L 63/104 (2013.01); H04L 67/141 (2013.01); H04L 69/324 (2013.01)

(58) Field of Classification Search
CPC ..... G06F 9/5077; H04L 12/18; H04L 63/104; H04L 67/141; H04L 69/324
See application file for complete search history.

(56) References Cited

U.S. PATENT DOCUMENTS

| | | | |
|---|---|---|---|
| 2002/0091697 A1* | 7/2002 | Huang | G06F 16/9535 |
| 2007/0198656 A1* | 8/2007 | Mazzaferri | G06F 9/5055 |
| | | | 709/218 |
| 2010/0131654 A1* | 5/2010 | Malakapalli | H04L 67/08 |
| | | | 709/227 |
| 2010/0205304 A1* | 8/2010 | Chaturvedi | H04L 61/5014 |
| | | | 709/226 |
| 2011/0153716 A1* | 6/2011 | Malakapalli | G06F 9/452 |
| | | | 718/1 |
| 2012/0239729 A1* | 9/2012 | Hefter | G06F 9/45533 |
| | | | 709/203 |
| 2014/0250439 A1* | 9/2014 | Parashar | G06F 9/5083 |
| | | | 718/104 |

(Continued)

*Primary Examiner* — Padma Mundur

(74) *Attorney, Agent, or Firm* — North Weber & Baugh LLP

(57) ABSTRACT

Presented are systems and methods for connecting client devices to remote virtual desktops in a virtual desktop infrastructure (VDI) environment without having to rely on connection brokers or standalone virtual machines, thus, decreasing compute and power resources and reducing complexity by reducing monitoring, patching, and security measures. Administrator-generated templates may be applied to client devices and virtual desktops to enable a dynamic host configuration protocol (DHCP) server to use custom DHCP options, such as Current Remote Server (CRS) configuration settings, VDI pool incrementing settings that utilize a CRS round-robin list, and VDI pool removal settings to increment and remove virtual desktops from a pool of virtual desktops.

20 Claims, 6 Drawing Sheets

(56) References Cited

U.S. PATENT DOCUMENTS

2014/0366093 A1* 12/2014 Oh ................. G06F 9/452 718/1
2016/0378534 A1* 12/2016 Oh ................. G06F 9/452 718/1

* cited by examiner

300

| CREATE CUSTOM DYNAMIC HOST CONFIGURATION PROTOCOL (DHCP) OPTIONS COMPRISING A CURRENT REMOTE SERVER (CRS) CONFIGURATION SETTING, A VIRTUAL DESKTOP INFRASTRUCTURE (VDI) POOL INCREMENTING SETTING THAT UTILIZES A CRS ROUND-ROBIN LIST, AND A VDI POOL REMOVAL SETTING | 305 |

↓

| IN RESPONSE TO RECEIVING, AT THE DHCP SERVER, FROM A CLIENT DEVICE IN A CLIENT DEVICE ESTATE A DHCP BROADCAST REQUEST THAT COMPRISES A REQUEST TO COMMUNICATE, ACCORDING TO THE VDI POOL INCREMENTING SETTING, A CRS VALUE IN A CRS ROUND-ROBIN LIST, BROADCAST THE CRS VALUE TO CLIENT DEVICES | 310 |

↓

| UNLESS THE CRS IS NOT AVAILABLE OR NOT ENABLED, COMMUNICATE TO THE CLIENT DEVICE THE CRS VALUE TO ENABLE THE CLIENT DEVICE TO LOG INTO THE CURRENTLY ACTIVE VIRTUAL DESKTOP | 315 |

405 — IN RESPONSE TO RECEIVING FROM A CLIENT DEVICE IN AN ENDPOINT DEVICE ESTATE A DYNAMIC HOST CONFIGURATION PROTOCOL (DHCP) BROADCAST REQUEST COMPRISING A REQUEST TO COMMUNICATE A CURRENT REMOTE SERVER (CRS) VALUE, BROADCAST THE CRS VALUE TO CLIENT DEVICES LOCATED IN THE ENDPOINT DEVICE ESTATE

↓

410 — IN RESPONSE TO RECEIVING NOTIFICATION THAT THE CLIENT DEVICE HAS BEEN GRANTED ACCESS TO A VIRTUAL DESKTOP, USING A VIRTUAL DESKTOP INFRASTRUCTURE (VDI) POOL INCREMENTING PROCESS TO INCREMENT THE CRS VALUE TO OBTAIN AN INCREMENTED CRS VALUE REPRESENTING A NEXT VIRTUAL DESKTOP IN A CRS ROUND-ROBIN LIST

↓

415 — BROADCAST THE INCREMENTED CRS VALUE TO CLIENT DEVICES

↓

420 — IN RESPONSE TO AT LEAST ONE OF A VIRTUAL MACHINE RESOURCE UTILIZATION BEING EXCEEDED OR THE CLIENT DEVICE BEING DENIED ACCESS, REMOVE THE VIRTUAL DESKTOP FROM THE ROUND-ROBIN CRS LIST, INCREMENT THE CRS VALUE, AND DIVERT A LOGIN REQUEST TO THE NEXT VIRTUAL DESKTOP IN THE CRS ROUND-ROBIN LIST

↓

425 — IN RESPONSE TO ALL VIRTUAL DESKTOPS HAVING BEEN REMOVED FROM THE ROUND-ROBIN CRS LIST, BROADCAST TO THE CLIENT DEVICES A MESSAGE INDICATING THE UNAVAILABILITY OF THE VIRTUAL DESKTOPS

FIG. 4

SYSTEMS AND METHODS FOR CONNECTION BROKER FREE REMOTE DESKTOP CONNECTIONS IN A VIRTUAL DESKTOP ENVIRONMENT

BACKGROUND

The present disclosure relates generally to information handling systems. More particularly, the present disclosure relates to systems and methods for connection broker free remote desktop connections in virtual desktop environments.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As workplaces increasingly move toward remote working environments and remote services, the demand for simple remote working solutions continues to rise. In the enterprise IT domain, centralized management of VDI (virtual desktop infrastructure) enables user mobility and allows for the sharing of common processing and memory resources, thereby, reducing IT costs. VDI management allows users to access compute resources remotely either on a single-user-per-virtual machine (VM) ("single user VM") or multiple-users-per-VM ("session-based") basis. At their core, VDI environments have a management or control component, known as a "connection broker," whose functions include managing user entitlements, tracking VM connection status, managing display protocol usage, and the like. Such connection brokers add an extra layer of complexity to VDI architectures since they usually require deployment of a standalone VM that not only consumes additional compute and power resources but also requires additional monitoring, patching, and security measures.

Accordingly, it is highly desirable to have improved VDI architectures and methods that do not have to rely on connection brokers and overcome the shortcomings associated with broker-based environments.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 3 depicts a process for implementing a connection broker-free VDI environment using a template for client devices, according to embodiments of the present disclosure.

FIG. 4 depicts a process for connecting to remote desktops in a connection broker-free VDI environment, according to embodiments of the present disclosure.

DETAILED DESCRIPTION OF EMBODIMENTS

Figure 1:
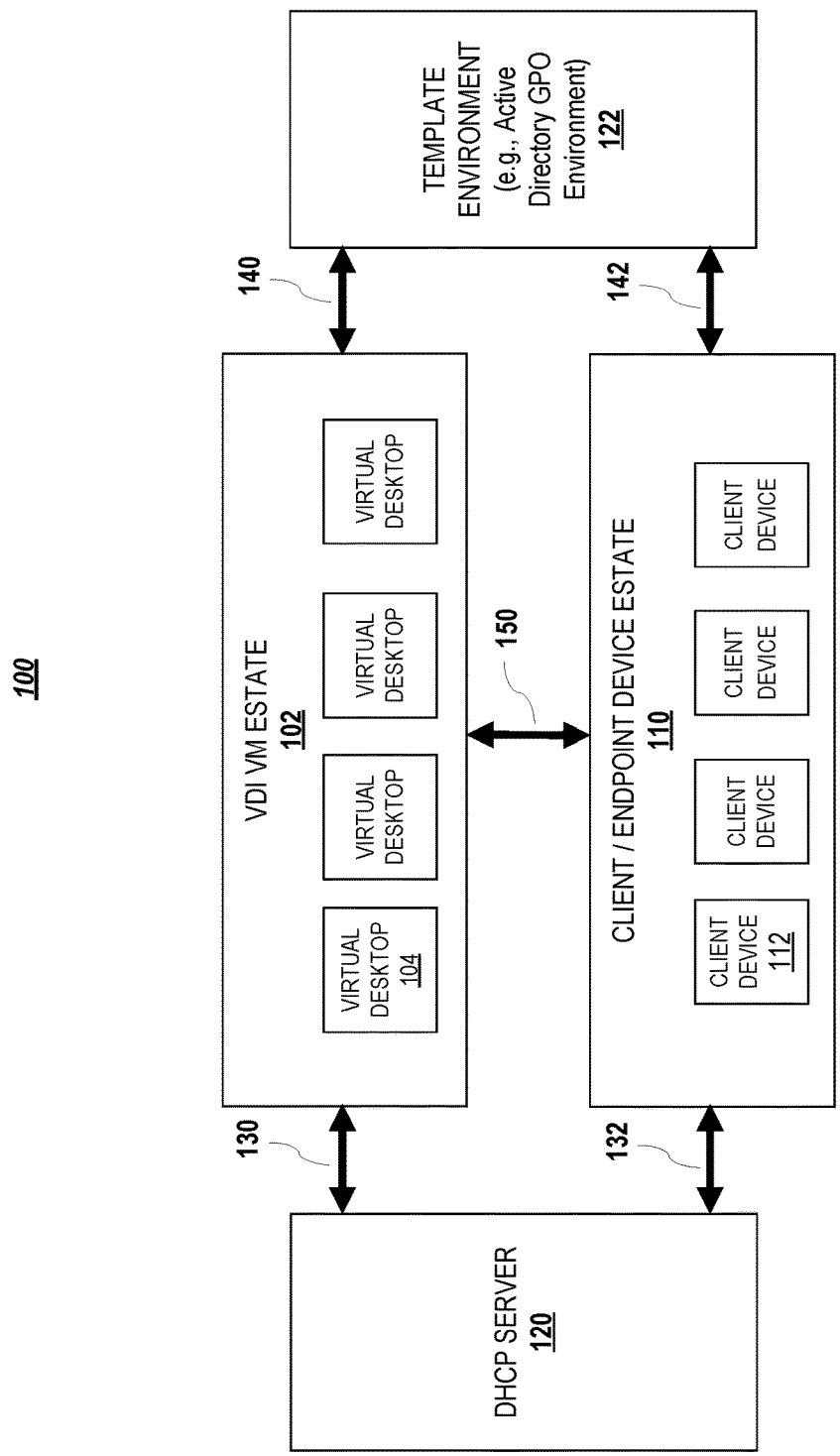
FIG. 1 ("FIG. 1") depicts a connection broker-free VDI architecture according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment.

Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall be noted that although embodiments described herein may be within the context of virtual dynamic host configuration protocol (DHCP) servers, aspects of the present disclosure are not so limited. Accordingly, the aspects of the present disclosure may be applied or adapted for use in other contexts.

In this document, current remote server (CRS) refers to a CRS round-robin list that comprises virtual desktops and may comprise additional values, such as "none available" and/or "not enabled". The terms "configuration settings," "settings," and "parameters" are used interchangeably. Similarly, the terms "VM," "VDI VM," and "virtual desktop" are used interchangeably.

FIG. 1 depicts a connection broker-free VDI architecture according to embodiments of the present disclosure. In one or more embodiments, system 100 comprises VDI VM estate 102, client device estate 110, DHCP server 120, and template environment 122. VDI VM estate 102 may comprise any number of VMs 104 that may operate on, e.g., a physical server that has been partitioned into several virtual servers by, e.g., a hypervisor that creates, runs, and monitors VMs 104. Similarly, client device estate 110 may comprise any number of end-user or client devices 112, such as laptops, PCs, and tablets that may be used to connect users to virtual desktop instances. DHCP server 120 may be implemented in a virtual machine or in a network device, such as a router, to accomplish the various objectives of the present disclosure, including performing load-balancing between virtual VMs 104, performing fault handling operations, and the like.

Template environment 122 may be implemented, for example, as an active directory group policy object (GPO) environment.

As will become apparent to the reader, unlike in legacy designs that use a VDI connection broker to connect users to virtual desktop instances, which acts as a gateway or intermediary between a user and a remote server that monitors and manages the status and availability of virtual desktops, system 100 allows users to connect to virtual desktops (e.g., 104) in a multi-VM VDI environment without the need for such a dedicated connection broker. In one or more embodiments, one or more may operate VDI services and host a VM pool of dynamically created and independent VM desktop instances. Users may remotely access virtual desktops 104 from client devices 112 independent of the underlying host hardware that operates VDI VM estate 102.

In one or more embodiments, client devices 112 may concurrently connect to separate virtual desktops 104 that accommodate customized settings and access for launching individual applications for a remote session on a virtual desktop 104 provided to client device 112. VM images and user-related data, such as access information, may be remotely stored on a host computer that may provide the user with a personalized virtual desktop 104 that may have a unique identifier in a pool of virtual desktops.

An administrator may use a VDI management software to provision new virtual desktops 104, create virtual desktop pools, and perform additional management functions. The administrator may further use parameters or configuration settings to create custom DHCP options that client devices 112 are programmed to use when attempting to access a VDI environment.

As depicted in FIG. 1, virtual desktops (e.g., 104) in VDI VM estate 102 may communicate custom DHCP option traffic 130 with DHCP server 120, communicate templatized configuration information traffic 140 with template environment 122, and communicate remote desktop traffic 150 with client devices (e.g., 112) in endpoint device estate 110. Similarly, client devices (e.g., 112) in endpoint device estate 110 may communicate custom DHCP option traffic 132 with DHCP server 120 and templatized configuration information traffic 132 with template environment 122.

In one or more embodiments, DHCP server 120 may specifically request that virtual desktop and/or client devices request and/or use certain parameters or custom DHCP options before client device 112 is authenticated and remote access to virtual desktop 104 is granted to a user. For example, DHCP server 120 may request that client device 112 requests remote access to a currently available virtual desktop as identified by a current remote server (CRS) value. DHCP server 120 may generate and broadcast to client devices 112 the CRS value, which may be used to assign virtual desktops 104 to client devices 112. The CRS value may indicate a currently available virtual desktop 104. In one or more embodiments, DHCP server 120 may generate the CRS value after receiving from client device 112 a DHCP broadcast request that comprises a request to send the CRS value. DHCP server 120 may generate the CRS value according to a configuration setting that defines a CRS round-robin list that may be adjusted, e.g., depending on the availability of virtual desktops in a pool of virtual desktops.

In one or more embodiments, once virtual desktop 104 grants access to client device 112 after a successful login attempt by client device 112, such access may be viewed by DHCP server 120 as a request to increment the CRS value according to a VDI pool incrementing process that utilizes VDI pool incrementing settings to adjust the CRS round-robin list. In one or more embodiments, the incremented CRS value may correspond to a subsequent virtual desktop in the CRS round-robin list and may be broadcast to all client devices in endpoint device estate 110 using any known protocol in the art. Conversely, the denial of access to virtual desktop 104 may be viewed by DHCP server 120 as a "request" to remove virtual desktop 104 from the round-robin CRS list, e.g., before identifying the next virtual desktop in the CRS round-robin list that may communicate with client 112.

In one or more embodiments, in a session-based environment where several users can log into virtual desktop 104, virtual machine resource utilization (central processing unit (CPU), memory, disk input and output (I/O), etc.) may be monitored, and when the resource utilization exceeds a specific threshold, virtual desktop 104 may issue an instruction to DHCP server 120 to remove virtual desktop 104 from the CRS round-robin list, i.e., from the pool of virtual desktops. Once all virtual desktops in the pool have been removed from the list, DHCP server 120 may broadcast to client devices (e.g., 112) a message that indicates that the pool is no longer available.

Figure 2:
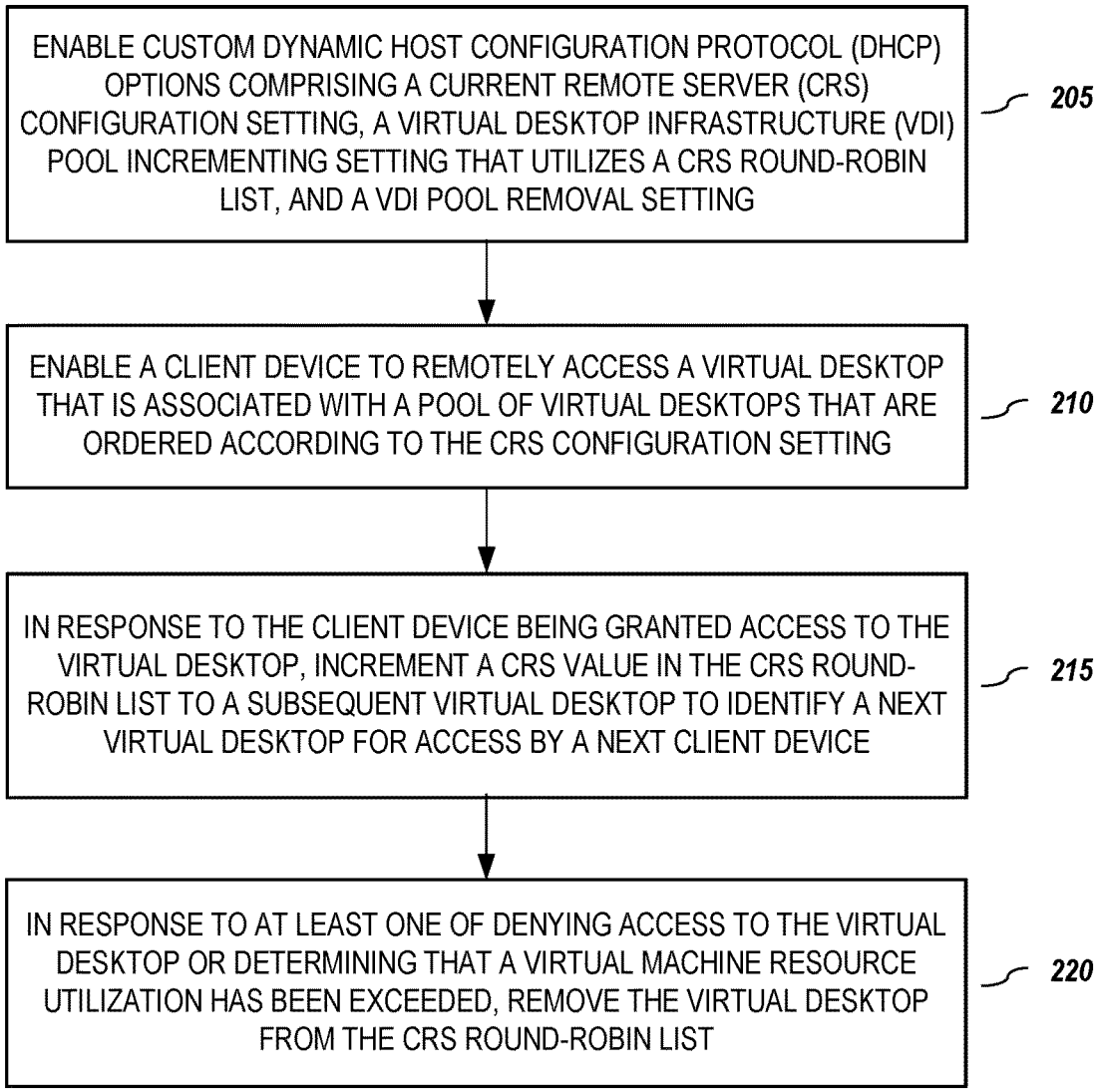
FIG. 2 depicts a process for implementing a connection broker-free VDI environment using a template for virtual desktops, according to embodiments of the present disclosure.

FIG. 2 and FIG. 3 discuss processes for implementing a connection broker-free VDI environment using templates for virtual desktops and client devices, respectively. FIG. 4 discusses the operation of connecting to remote desktops in a connection broker-free VDI environment, according to embodiments of the present disclosure.

FIG. 2 depicts a process for implementing a connection broker-free VDI environment using a template for virtual desktops, according to embodiments of the present disclosure. In one or more embodiments, process 200 may begin when a DHCP server that may be implemented on a physical networking device enables (205) custom DHCP options. The custom DHCP options may comprise CRS configuration settings, VDI pool incrementing settings that utilize a CRS round-robin list, and VDI pool removal settings. In one or more embodiments, security groups may be created, e.g., in a directory system. For example, a security group may comprise a pool of virtual desktops that are ordered according to the CRS configuration setting in a VDI VM estate, and another security group may comprise the client devices that may be associated with an endpoint device estate.

In one or more embodiments, in response to a template for virtual desktops being applied to the first security group, e.g., by a templating process such as active directory GPOs that facilitates client devices accessing the VDI environment, the DHCP server may enable (210) a client device to remotely access a virtual desktop. In response to the virtual desktop granting access to the client device, the DHCP server may then increment a CRS value in the CRS round-robin list to a value that identifies a subsequent virtual desktop for access by a next client device. In the event that the DHCP server denies access to the virtual desktop, or determines that a virtual machine resource utilization has been exceeded, the DHCP server may remove (220) the virtual desktop from the CRS round-robin list.

In one or more embodiments, the round robin process enables load-balancing. In addition, the removal of virtual desktops from the CRS round-robin list due to, e.g., the occurrence of a failed connection attempt or the exceeding of a resource utilization threshold by the virtual desktops enables fault handling operations.

It shall be noted that: (1) certain steps may optionally be performed; (2) steps may not be limited to the specific order set forth herein; (3) certain steps may be performed in different orders; and (4) certain steps may be done concurrently.

FIG. 3 depicts process for implementing a connection broker-free VDI environment using a template for client devices, according to embodiments of the present disclosure. In one or more embodiments, process 300 may begin when a DHCP server creates (305) custom DHCP options and security groups similar to those mentioned with reference to FIG. 2. In one or more embodiments, the DHCP server may, in response to receiving from the client device a DHCP broadcast request that comprises a request to communicate a CRS value in a CRS round-robin list, broadcast (310) that CRS value to client devices in an endpoint device estate.

In one or more embodiments, unless the CRS is not available or not enabled, the DHCP server may communicate to the client device the CRS value to enable the client device to log into the currently active virtual desktop according to the VDI pool incrementing process. If the CRS is not available or not enabled, at least one of an error message or a custom DHCP option value that indicates that the CRS is not available or not enabled may be communicated to the client device.

In one or more embodiments, to accommodate a multi-user login to at least one of the virtual desktops, in response to a final virtual desktop in the CRS round-robin list having been reached, the DHCP server may resume to increment from the beginning of the CRS round-robin list according to the VDI pool incrementing process.

FIG. 4 depicts a process for connecting client devices to remote desktops in a connection broker-free VDI environment, according to embodiments of the present disclosure. In one or more embodiments, process 400 may begin when in response to a DHCP server receiving from a client device a DHCP broadcast request that comprises a request to communicate a CRS value associated with a CRS round-robin list, the DHCP server broadcasts (405) the CRS value to client devices in an endpoint device estate. Once a user requests access via a VDI access software on an enabled client device, the user will be able to login to one of the VMs in a VDI pool, as long as the required privileges are enabled and the user is successfully authenticated.

In one or more embodiments, in response to receiving notification that the client device has been granted access to a virtual desktop, the DHCP may use a VDI pool incrementing process to increment (410) the CRS value to obtain an incremented CRS value that represents a next virtual desktop in the CRS round-robin list. The DHCP may broadcast (415) the incremented CRS value to client devices in the endpoint device estate.

In one or more embodiments, in response to at least one of a virtual machine resource utilization being exceeded or the client device being denied access, the DHCP server may remove (420) the virtual desktop from the round-robin CRS list, increment the CRS value, and divert a login request to the next virtual desktop in the CRS round-robin list.

In one or more embodiments, in response to all virtual desktops having been removed from the round-robin CRS list, the DHCP server may broadcast (425) to the client devices a message indicating an unavailability of the virtual desktops.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read only memory (ROM), and/or other types of memory. Additional components of the computing system may include one or more disk drives, one or more network ports for communicating with external devices as well as various I/O devices, such as a keyboard, mouse, stylus, touchscreen, and/or video display. The computing system may also include one or more buses operable to transmit communications between the various hardware components.

Figure 5:
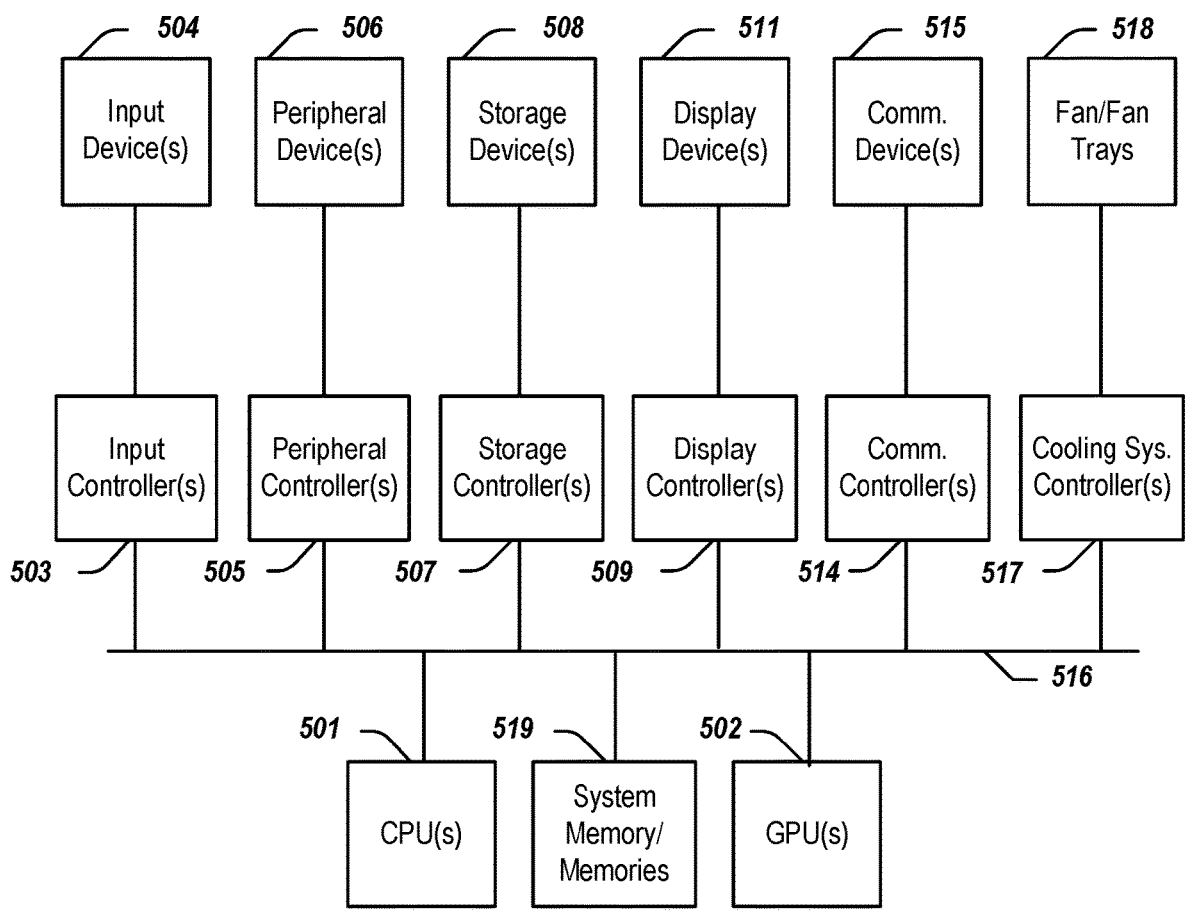
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more CPUs 501 that provides computing resources and controls the computer. CPU 501 may be implemented with a microprocessor or the like and may also include one or more graphics processing units (GPU) 502 and/or a floating-point coprocessor for mathematical computations. In one or more embodiments, one or more GPUs 502 may be incorporated within the display controller 509, such as part of a graphics card or cards. The system 500 may also include a system memory 519, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 500 comprises one or more fans or fan trays 518 and a cooling subsystem controller or controllers 517 that monitors thermal temperature(s) of the system 500 (or components thereof) and operates the fans/fan trays 518 to help regulate the temperature.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
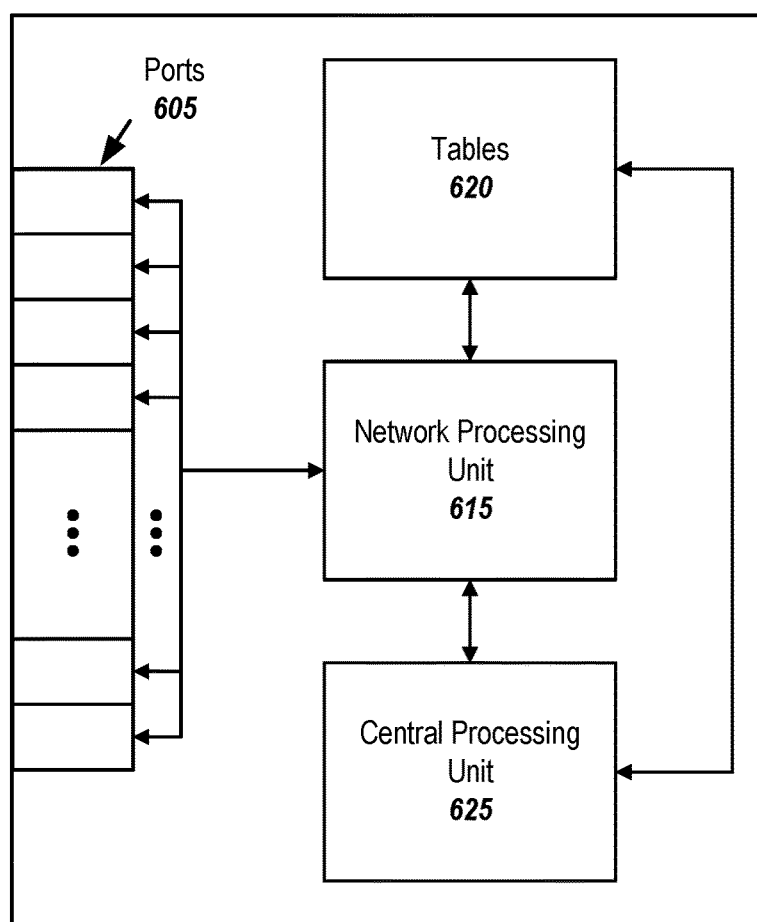
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a CPU 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as ASICs, PLDs, flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for implementing a connection broker-free virtual desktop infrastructure (VDI) environment, the method comprising:
   at a dynamic host configuration protocol (DHCP) server, enabling custom DHCP options comprising a Current Remote Server (CRS) configuration setting, a VDI pool incrementing setting that utilizes a CRS round-robin list, and a VDI pool removal setting;
   in response to a first template being applied to virtual desktops, one or more of the custom DHCP options causing the DHCP server to perform steps comprising:
      enabling a client device to remotely access a virtual desktop that is associated with a pool of virtual desktops that are ordered according to the CRS configuration setting;
      in response to granting access to the virtual desktop, incrementing a CRS value in the CRS round-robin list to a subsequent virtual desktop to identify a next virtual desktop for access by a next client device; and
      in response to at least one of denying access to the virtual desktop or determining that a virtual machine resource utilization has been exceeded, removing the virtual desktop from the CRS round-robin list; and
   in response to a second template being applied to client devices, one or more of the custom DHCP options causing the DHCP server to perform steps comprising:
      in response to receiving from the client device a DHCP broadcast request that comprises a request to communicate the CRS value, broadcasting the CRS value; and
      unless a CRS is not available or not enabled, granting access to the virtual desktop that is currently active according to the VDI pool incrementing process.

2. The method of claim 1 wherein the DHCP server is implemented on a physical networking device.

3. The method of claim 1, further comprising, in response to a final virtual desktop in the CRS round-robin list having been reached, resuming incrementing from the beginning of the CRS round-robin list to accommodate a multi-user login to at least one of the virtual desktops.

4. The method of claim 1 wherein prior to the virtual desktops indicating their availability to the client devices, the first template is applied to the virtual desktops, which are associated with a first security group.

5. The method of claim 1 wherein prior to the client devices accessing a broker-free VDI environment, the second template is applied to the client devices, which are associated with a second security group.

6. The method of claim 5 wherein the second security group is created in a directory system.

7. The method of claim 1, further comprising, the DHCP server indicating that the CRS is not available or not enabled by communicating to the client device at least one of an error message or a custom DHCP option value that indicates that the CRS is not available or not enabled.

8. The method of claim 1, wherein removing the virtual desktop further comprises performing at least one of load-balancing between the virtual desktops or fault handling.

9. A method for connecting client devices to remote desktops in a connection broker-free virtual desktop infrastructure (VDI) environment, the method comprising:
   in response to a client device being granted access to a virtual desktop based on a Current Remote Server (CRS) value that is associated with a CRS round-robin list, the CRS value having been broadcast to the client device by a dynamic host configuration protocol (DHCP) server, the DHCP server performing steps comprising:
      using a VDI pool incrementing process to increment the CRS value to a next virtual desktop in the CRS round-robin list; and
      broadcasting the CRS value to client devices in an endpoint device estate; and
   in response to at least one of a virtual machine (VM) resource utilization being exceeded or the client device being denied access, performing steps comprising:
      removing the virtual desktop from the round-robin CRS list;
      incrementing the CRS value;
      diverting a login request to the next virtual desktop in the CRS round-robin list; and
      in response to all virtual desktops having been removed from the round-robin CRS list, broadcasting to the client devices a message indicating an unavailability of the virtual desktops.

10. The method of claim 9, further comprising interpreting the client device being granted access to the virtual desktop as a request to increment the CRS value, and interpreting the client device being denied access to the virtual desktop as a request to remove the virtual desktop from the round-robin CRS list.

11. The method of claim 9, wherein the client device is granted access to the virtual desktop in response a request to remote login into an available virtual desktop based on the VDI pool incrementing process that defines the CRS round-robin list.

12. The method of claim 9, further comprising, in response to a final virtual desktop in the CRS round-robin list having been reached, resuming incrementing from the beginning of the CRS round-robin list to accommodate a multi-user login to at least one of the virtual desktops.

13. The method of claim 9 wherein prior to the virtual desktops associated with a first security group indicating their availability to the client devices, a first template is applied to the virtual desktops, the first template having been created in a directory system.

14. The method of claim 9 wherein prior to the client devices associated with a second security group accessing a broker-free VDI environment, a second template is applied to the client devices.

15. An information handling system for connecting client devices to remote desktops in a connection broker-free virtual desktop infrastructure (VDI) environment, the information handling system comprising a dynamic host configuration protocol (DHCP) server that comprises non-transitory computer-readable medium or media comprising one or more sequences of instructions which, when executed by at least one processor, causes steps to be performed comprising:

in response to receiving from a client device in an endpoint device estate a DHCP broadcast request that comprises a request to communicate a Current Remote Server (CRS) value, broadcasting the CRS value to client devices in the endpoint device estate, the CRS value being associated with a CRS round-robin list;

in response to receiving notification that the client device has been granted access to a virtual desktop, using a VDI pool incrementing process to increment the CRS value to obtain an incremented CRS value that represents a next virtual desktop in the CRS round-robin list; and broadcasting the incremented CRS value to the client devices; and in response to at least one of a virtual machine resource utilization being exceeded or the client device being denied access, performing steps comprising:

removing the virtual desktop from the round-robin CRS list;

incrementing the CRS value;

diverting a login request to the next virtual desktop in the CRS round-robin list; and in response to all virtual desktops having been removed from the round-robin CRS list, broadcasting to the client devices a message indicating an unavailability of the virtual desktops.

16. The DHCP server of claim 15 wherein the DHCP server is implemented in a physical networking device.

17. The DHCP server of claim 15 wherein the DHCP server interprets the client device being granted access to the virtual desktop as a request to increment the CRS value, and interpreting the client device being denied access to the virtual desktop as a request to remove the virtual desktop from the round-robin CRS list.

18. The DHCP server of claim 15 wherein the DHCP server, in response to a final virtual desktop in the CRS round-robin list having been reached, resumes incrementing from the beginning of the CRS round-robin list to accommodate a multi-user login to at least one of the virtual desktops.

19. The DHCP server of claim 15 wherein prior to the virtual desktops associated with a first security group indicating their availability to the client devices, a first template is applied to the virtual desktops, the first template having been created in a directory system.

20. The DHCP server of claim 19 wherein the directory system comprises a second security group that is associated with the client devices and to which, prior to the client devices accessing a broker-free VDI environment, a second template is applied.

* * * * *